US008707251B2

(12) United States Patent
Amir et al.

(10) Patent No.: US 8,707,251 B2
(45) Date of Patent: Apr. 22, 2014

(54) BUFFERED VIEWING OF ELECTRONIC DOCUMENTS

(75) Inventors: Arnon Amir, Saratoga, CA (US);
Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 2768 days.

(21) Appl. No.: 10/862,227

(22) Filed: Jun. 7, 2004

(65) Prior Publication Data

US 2006/0041837 A1  Feb. 23, 2006

(51) Int. Cl.
*G06F 9/44* (2006.01)

(52) U.S. Cl.
USPC .......................................... 717/106; 717/127

(58) Field of Classification Search
USPC ...................... 707/2; 717/106–107, 126–127, 717/168–178; 726/22–24
See application file for complete search history.

(56) References Cited

U.S. PATENT DOCUMENTS

| | | | | |
|---|---|---|---|---|
| 5,710,883 A * | 1/1998 | Hong et al. | .................... | 709/246 |
| 5,761,683 A * | 6/1998 | Logan et al. | .................. | 715/206 |
| 5,889,943 A * | 3/1999 | Ji et al. | .............. | 726/22 |
| 5,903,475 A * | 5/1999 | Gupte et al. | .................... | 703/16 |
| 6,073,137 A * | 6/2000 | Brown et al. | .......................... | 1/1 |
| 6,092,194 A * | 7/2000 | Touboul | ........................... | 726/24 |
| 6,154,844 A * | 11/2000 | Touboul et al. | ................... | 726/24 |
| 6,167,520 A * | 12/2000 | Touboul | ........................... | 726/23 |
| 6,253,337 B1 * | 6/2001 | Maloney et al. | ............ | 714/38.14 |
| 6,275,938 B1 * | 8/2001 | Bond et al. | ....................... | 726/23 |
| 6,339,773 B1 | 1/2002 | Rishe | | |
| 6,434,556 B1 * | 8/2002 | Levin et al. | ............................ | 1/1 |
| 6,611,925 B1 * | 8/2003 | Spear | .......................... | 714/38.14 |
| 6,701,440 B1 * | 3/2004 | Kim et al. | ......................... | 726/24 |
| 6,745,245 B1 * | 6/2004 | Carpenter | ....................... | 709/229 |
| 6,785,818 B1 * | 8/2004 | Sobel et al. | ....................... | 726/22 |
| 6,915,513 B2 * | 7/2005 | Duesterwald et al. | ......... | 717/168 |
| 6,981,279 B1 * | 12/2005 | Arnold et al. | .................... | 726/22 |
| 6,986,062 B2 * | 1/2006 | Carpenter | .......................... | 726/3 |
| 7,069,589 B2 * | 6/2006 | Schmall et al. | ................... | 726/24 |
| 7,111,246 B2 * | 9/2006 | Sauve et al. | .................... | 715/809 |
| 7,284,187 B1 * | 10/2007 | Corboy | ............................ | 715/203 |
| 7,313,822 B2 * | 12/2007 | Ben-Itzhak | ...................... | 726/24 |
| 7,526,762 B1 * | 4/2009 | Astala et al. | ................... | 717/171 |

(Continued)

OTHER PUBLICATIONS

Crosbie M, Spafford G. "Defending a Computer System using Autonomous Agents". Technical Report No. 95-022, Dept. of Comp. Sciences, Purdue University, Mar. 1996. http://citeseer.ist.psu.edu/crosbie96defending.html.*

(Continued)

*Primary Examiner* — Jason Mitchell
(74) *Attorney, Agent, or Firm* — Gibb & Riley, LLC (57) ABSTRACT

A system, program storage device, and method of buffering an electronic document received from a host computer, wherein the method comprises determining whether an original source code of the electronic document includes executable coding which when executed by a client computer, causes the client computer to perform undesired operations, and producing an alternate source code of the electronic document, which eliminates the coding, wherein the undesired operations are characterized as undesirable based on predetermined settings established by the client computer. The electronic document comprises any of a web page, electronic mail message, an electronic mail attachment, a note in a hypertext format, a text document, a text file, and an application-specific electronic document. Each of the original source code and the alternate source code comprises a hypertext transfer protocol (HTTP) source code.

41 Claims, 4 Drawing Sheets

(56) References Cited

U.S. PATENT DOCUMENTS

| | | | |
|---|---|---|---|
| 7,610,057 B2* | 10/2009 | Bahl et al. | 455/522 |
| 7,640,590 B1* | 12/2009 | McCorkendale et al. | 726/25 |
| 2002/0004908 A1* | 1/2002 | Galea | 713/200 |
| 2002/0092019 A1* | 7/2002 | Marcus | 725/37 |
| 2002/0144129 A1* | 10/2002 | Malivanchuk et al. | 713/188 |
| 2002/0154691 A1 | 10/2002 | Kost et al. | |
| 2002/0178375 A1* | 11/2002 | Whittaker et al. | 713/200 |
| 2002/0188649 A1* | 12/2002 | Karim | 709/104 |
| 2003/0065926 A1* | 4/2003 | Schultz et al. | 713/188 |
| 2003/0093682 A1* | 5/2003 | Carmona et al. | 713/187 |
| 2003/0097409 A1* | 5/2003 | Tsai | 709/206 |
| 2003/0097591 A1* | 5/2003 | Pham et al. | 713/201 |
| 2003/0098883 A1* | 5/2003 | Pennell et al. | 345/781 |
| 2003/0101431 A1* | 5/2003 | Duesterwald et al. | 717/111 |
| 2004/0006715 A1* | 1/2004 | Skrepetos | 713/201 |
| 2004/0068695 A1* | 4/2004 | Daniell et al. | 715/513 |
| 2004/0128536 A1* | 7/2004 | Elzam et al. | 713/201 |
| 2004/0158722 A1* | 8/2004 | Carpenter | 713/182 |
| 2004/0255157 A1* | 12/2004 | Ghanea-Hercock | 713/201 |
| 2004/0255161 A1* | 12/2004 | Cavanaugh | 713/201 |
| 2005/0015455 A1* | 1/2005 | Liu | 709/207 |
| 2005/0066290 A1* | 3/2005 | Chebolu et al. | 715/808 |
| 2005/0108075 A1* | 5/2005 | Douglis et al. | 705/8 |
| 2005/0177753 A1* | 8/2005 | Carpenter | 713/201 |
| 2005/0268112 A1* | 12/2005 | Wang et al. | 713/188 |
| 2005/0289148 A1* | 12/2005 | Dorner et al. | 707/10 |
| 2006/0031940 A1* | 2/2006 | Rozman et al. | 726/27 |
| 2006/0075500 A1* | 4/2006 | Bertman et al. | 726/24 |
| 2006/0075501 A1* | 4/2006 | Thomas et al. | 726/24 |
| 2006/0130144 A1* | 6/2006 | Wernicke | 726/24 |
| 2006/0161986 A1* | 7/2006 | Singh et al. | 726/24 |
| 2007/0174915 A1* | 7/2007 | Gribble et al. | 726/24 |
| 2008/0016568 A1* | 1/2008 | Szor et al. | 726/22 |
| 2008/0294726 A1* | 11/2008 | Sidman | 709/206 |

OTHER PUBLICATIONS

Peter Sayer, "Opera Fixes Security Holes in Web Browser", IDG News Service, Nov. 25, 2003, 3 pages.

http://www.microsoft.com/technet/security/bulletin/fq99-049.asp?frame=true, "Microsoft Security Bulletin (MS99-049): Frequently Asked Questions", 4 pages.

http://www.pcworld.com/howto/article/0,aid,86928,000asp, Stuart J. Johnson, "Bugs and Fixes: D'oh! More Holes in Internet Explorer", May 2002, 3 pages.

http://www.winguides.com/, "Winguides Network for Windows", 2 pages.

http://www.onlineandsafe.com/n03/106jun/jun11.htm, "Online and Safe", Jun. 11, 2003, 5 pages.

http://www.esecurityplanet.com/alerts/archives.php/200401, "eSecurity Planet: Alerts", Jan. 2004, 5 pages.

http://www.esecurityplanet.com/alerts/article.php/3301901, "Trojan Sends Emails, Downloads Malicious Files", Jan. 21, 2004, 6 pages.

http://users.iafrica.com/c/cq/cquirke/safe2000.htm, "Safe Computing Practice 2000", 6 pages.

http://www.internetnews.com/dev-news/article.php/1364831, "Microsoft Warns Again on MSN Chat Flaw", Bob Woods, 5 pages.

http://www.securitytracker.com/alerts/2002/Feb/1003519.html, "Microsoft Internet Explorer (IE) HTML Direcive Buffer Overflow Lets Remote Users Cause Arbitrary Code to Be Executed on Another User's Computer", Feb. 12, 2002, 5 pages.

http://www.cs.washington.edu/lab/sw/browsers.html, "Web Browser Security", Dec. 19, 2001, 7 pages.

* cited by examiner

Prior Art

BUFFERED VIEWING OF ELECTRONIC DOCUMENTS

BACKGROUND OF THE INVENTION

1. Field of the Invention

The invention generally relates to computer technology, and more particularly to buffering systems which provide security in accessing/viewing electronic documents and web pages.

2. Description of the Related Art

Owners of web sites and senders of e-mail (collectively referred to as the "host") can cause significant damage to viewers of web pages and recipients of e-mail (collectively referred to as the "client") by causing computers to download files which when later executed by the client's computer, cause unwanted changes to the configuration of the client's computer or perform unwanted operations by the computer. The unwanted operations could include sending out unintended e-mail, logging into other computers, and transferring files out of the client's computer. For example, hosts may plant viruses which can spread and infect the client's computer. Electronic mail is analogous to a web page in the sense that it may contain links and scripts. Other electronic documents, such as word processing files, "pdf" files, and other types of application-specific files may also contain executable scripts.

Many users are aware that mouse clicks can activate some executable scripts embedded in a web page, but fewer users are aware that placing the mouse over certain other parts of a browser's window can also activate such scripts. This is known by programmers as "on mouse over" activation of code and scripts. Standard protection methods allow the user to disable the running of scripts unless they come from one of a list of servers that are trusted by the user. However, this protection is too restrictive because it limits the process of exploring web sites, which have not been previously visited. Thus, the user may wish to visit a web site that appears at the top of some search results, but cannot activate all of the features of such web sites. Unfortunately, there is no easy way for the user to know about such dangerous "on mouse over" areas in the web page without either actually placing the mouse over these areas and suffering the potentially deleterious consequences, or checking the HTML source code, which could be very difficult, time consuming, and often beyond the technical capabilities and understanding of an average user.

Thus, there is a need for users (clients) to be able to easily retrieve/view the useful contents of web pages and e-mail messages along with other electronic documents without compromising the security of their computers.

SUMMARY OF THE INVENTION

The invention provides a system, program storage device, and method of buffering an electronic document received from a sender, wherein the method comprises determining whether an original source code of the electronic document includes executable coding which when executed by a client computer, causes the client computer to perform undesired operations, and producing an alternate source code of the electronic document, which eliminates the coding, wherein the undesired operations are characterized as undesirable based on predetermined settings established by the client computer. The electronic document comprises any of a web page, electronic mail message, an electronic mail attachment, a note in a hypertext format, a text document, a text file, and an application-specific electronic document. Each of the original source code and the alternate source code comprises a hypertext transfer protocol (HTTP) source code.

Additionally, the undesired operation comprises any of altering a configuration of the client computer, installing a code in the client computer, installing a plug-in command in the client computer, installing a program in the client computer, installing an application in the client computer, installing executable scripts in the client computer, saving a file in the client computer, reading a file in the client computer, transmitting a file from the client computer, and altering a file, security-related information, or personal settings from the client computer.

The step of determining comprises establishing a set of rules and patterns for detection and inspection of different types of operations, system calls, registry alterations, and browser settings alterations on the client computer, wherein the rules and patterns are learned from a set of samples using machine learning techniques comprising classifier training. Additionally, the step of determining comprises gathering information and user decisions about controlled links in the electronic document, or a history of previous access to the electronic document or to a substantially similar document; and using the information to adjust the set of rules. Moreover, the step of producing is performed on any of the client computer, a server storing the electronic document, a proxy server attached to the client computer, and an intermediary computer operable for providing a security service to buffer the electronic document. Also, the alternate source code disables linked items in the electronic document, and the alternate source code controls access to linked items in the electronic document.

Furthermore, the sender comprises any of a host computer, a server, and a program storage device. The method further comprises allowing the client computer a choice of whether to substitute the original source code with the alternate source code, and presenting to the client computer a description of the coding, wherein the description comprises an explanation of an effect to the client computer of accepting the coding by the client computer, wherein the description comprises an identification of hidden commands and hidden links in the original source code, wherein the description comprises a determination of a validity of information included in the coding, and wherein the description comprises instructions relating to scripts, code, dynamic HTML or self-modifying code, or plug-ins that run when the client computer retrieves the electronic document. The instructions further relate to scripts associated with or activated by clickable elements such as form buttons, figures and embedded links, hidden requests to change security-related settings or privacy-related settings or any other settings of the browser, the computer, the operating system or any of the applications installed thereon, or to install/remove applications.

Another aspect of the invention provides a method of filtering an electronic document received from a sender, wherein the method comprises analyzing a first source code of the electronic document, wherein the first source code comprises first coding instructions which when executed by a client computer, causes changes or may cause a change in a configuration of the client computer which are undesired by the client computer, and second coding instructions which when executed by the client computer, are incapable of altering the configuration of the client computer; and generating a second source code of the electronic document, wherein the second source code substitutes the first coding instructions with the second coding instructions.

In another embodiment, the invention provides a system for filtering an electronic document received from a sender, wherein the system comprises a buffer configured for determining whether an original source code of the electronic document includes coding which when executed by a client computer, causes changes in a configuration of the client computer which are unwanted by the client computer, wherein the buffer is adapted to produce an alternate source code of the electronic document, which eliminates the coding, wherein the electronic document comprises any of a web page, electronic mail, and an application-specific electronic document, and wherein each of the original source code and the alternate source code comprises a hypertext transfer protocol (HTTP) source code.

The alternate source code is adapted for disabling linked items in the electronic document. Additionally, the alternate source code is adapted for controlling access to linked items in the electronic document. Moreover, the alternate source code is adapted for disabling clickable items in the electronic document. The system further comprises means for allowing the client computer to accept or delete the coding and a user interface connected to the buffer, wherein the user interface is configured for presenting to the client computer a description of the coding.

The description comprises an explanation of an effect to the client computer of accepting the coding by the client computer. Also, the description comprises an identification of hidden commands and hidden links in the original source code. Moreover, the description comprises a determination of a validity of information included in the coding. Additionally, the description comprises instructions relating to scripts that run when the electronic document is retrieved by the client computer, wherein the user interface is embedded into the alternate source code by adding a hypertext markup language (HTML) code and scripts to produce new mouse over information and controlled clickable items, and wherein the user interface is displayed in a separate window. Furthermore, the separate window is operable for controlling the electronic document in a primary window by altering the electronic document in the separate window and adding scripts that associate controls in the separate window with disabled or controlled operations in the primary window.

Another aspect of the invention provides a system of filtering an electronic document received from a sender, the system comprising means for analyzing a first source code of the electronic document, wherein the first source code comprises first coding instructions which when executed by a client computer, causes changes in a configuration of the client computer which are undesired by the client computer, and second coding instructions which when executed by the client computer, are incapable of altering the configuration of the client computer; and means for generating a second source code of the electronic document, wherein the second source code substitutes the first coding instructions with the second coding instructions.

The invention is advantageous in improving the safety of viewing web pages and using web-based applications. Any entity, and in particular an e-commerce entity, which relies on these activities would benefit from the invention in the sense that customers would be more inclined to use the applications presented on a web site if they feel safe when visiting the web site and downloading files. Other advantages provided by the invention included increased protection of a client computer, software, and settings, as well as privacy against invasion by a third party. Furthermore, the invention allows for better user experience in the navigation of web pages by eliminating otherwise unpredictable behaviors caused by hidden codes and scripts. Additionally, the invention achieves better control over content that arrives at the client computer in the form of documents and files.

These and other aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description with reference to the drawings, in which:

FIG. 3(*a*) is a flow diagram illustrating a preferred method of the invention;

FIG. 3(*b*) is a flow diagram illustrating a preferred method of the invention.

DETAILED DESCRIPTION OF PREFERRED EMBODIMENTS OF THE INVENTION

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As mentioned, there is a need for users (clients) to be able to easily retrieve/view the useful contents of web pages and e-mail messages along with other electronic documents without compromising the security of their computers. Referring now to the drawings, and more particularly to FIGS. 1 through 4, there are shown preferred embodiments of the invention.

Again, because e-mail is analogous to a web page in terms of containing links and scripts, the invention is only discussed in terms of web pages. However, those skilled in the art would readily understand that the invention is applicable to e-mail and to other electronic documents and their respective viewers.

Figure 1:
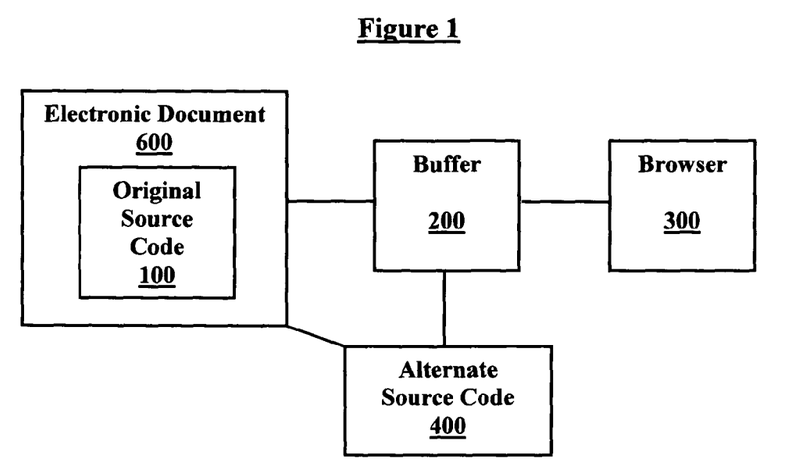
FIG. 1 is a block diagram illustrating an embodiment of the invention.

As illustrated in FIG. 1, the invention provides a buffer 200 between an original HTML source code 100 associated with an electronic document and a browser 300. In one embodiment, an analysis is performed in the buffer 200 and an alternate "safe" HTML document 400 is produced that preserves as much as is considered safe from the original HTML source 100. That is, "unsafe" features of the original HTML source code 100 are not included in the alternate HTML document 400. Unsafe features of the original HTML source code 100 include any scripts that can run on a client machine 700 (shown in FIG. 2) without understanding their effect, and which result in the loss of productivity, loss of data, and which are capable of causing such damage to other computers connected on the network 800.

Figure 2:
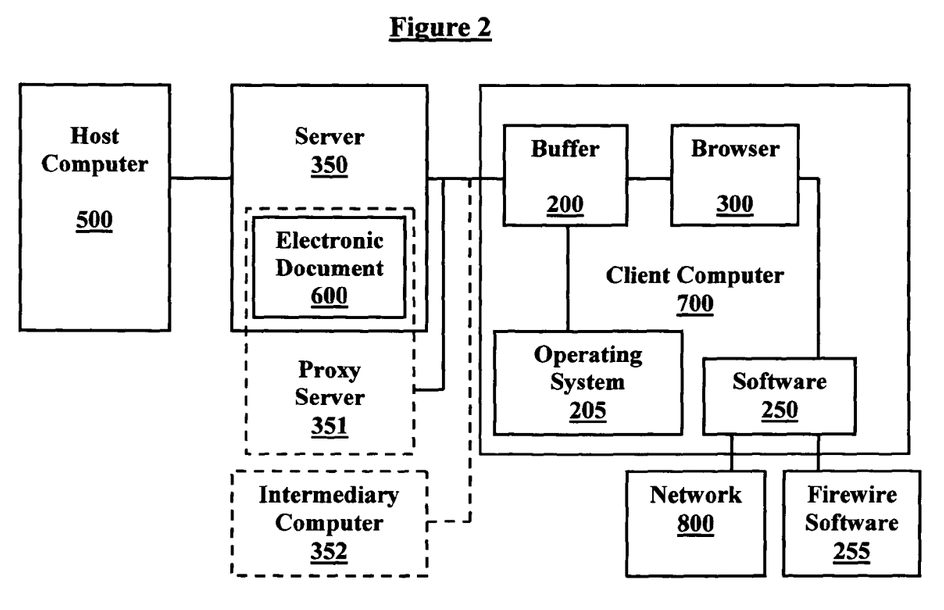
FIG. 2 is a system according to an embodiment of the invention.

For example, the unsafe features may result in potentially harmful or undesired or unwanted operations on the client computer 700, or changes in the configuration of the client computer 700. Examples of potentially harmful or undesired/unwanted operations include file deletions, file alterations, alteration of properties of files (in particular, access lists; i.e., permissions), alterations of user administration data, alterations of default values (e.g., the start page of the browser), installation of agents that hinder the operation of anti-spy, anti-spam, and anti-virus software, transferring files, transferring just the data out of the computer, sending e-mail without the sender's permission and/or authorization, "stealing" CPU time by running some programs and effectively turning the computer into a "server" for outside activities, or simply slowing the operations of the computer down for no benefit to the intruder. Examples of changes in the configuration of the client computer 700 include generally any executable code that is kept in storage and memory on the client computer 700. The crucial changes in configuration apply when changes are made to registry, data, default parameters and anything that affects the operation of the client computer 700 and the integrity of the data stored therein.

As such, the safe HTML document 400 indicates what the unsafe features of the original HTML source 100 are while neutralizing the danger, and prompting the user (as relayed through the browser 300) to decide how to handle the unsafe features. An advantage provided by the invention over conventional solutions is that the user does not lose anything that is safe, does not retrieve/view anything that is unsafe, and does not have to waste much time in making his/her decision of how to handle the unsafe features (view them, not view them, etc.). In fact, the production of the safe HTML document 400 and presentation to the user of the unsafe features can occur within a few milliseconds to a few seconds, depending on the connection speed of the browser 300.

A system for implementing the invention is illustrated in FIG. 2, wherein the system comprises a host computer 500, which transmits or otherwise hosts an electronic document 600. The electronic document 600 is capable of being retrieved, viewed, downloaded, or otherwise executed by a client computer 700. The client computer 700 comprises a user interface browser 300, which presents the electronic document 600 to a user. Additionally, the client computer 700 includes a buffer 200 to filter the unsafe features of the electronic document 600, wherein the unsafe features of the electronic document include coding which when executed by the client computer 700, are capable of altering, or otherwise causing deleterious effects on the client computer 700. Moreover, the client computer 700 comprises an operating system 205 for executing coding instructions to operate the client computer 700.

Generally, the deleterious effects include undesired/unwanted operation of the client computer 700 and include altering a configuration of the client computer 700, installing a code in the client computer 700, installing a plug-in command in the client computer 700, installing a program in the client computer 700, installing an application in the client computer 700, installing executable scripts in the client computer 700, saving a file in the client computer 700, reading a file in the client computer 700, transmitting a file from the client computer 700, and altering a file, security-related information, or personal settings from the client computer 700. Additionally, other undefined and undesired operations may occur, which affect the software and hardware of the client computer 700, or may affect the software and hardware of other computers linked to the client computer 700, or to other computers running the same files as were previously run on the client computer 700.

In other words, the invention provides a system for filtering an electronic document received from a host computer 500, wherein the system comprises a buffer 200 configured for determining whether an original source code 100 of the electronic document 600 includes coding which when executed by a client computer 700, causes changes in the configuration of the client computer 700 which are unwanted by the client computer 700, wherein the buffer 200 is adapted to produce an alternate source code 400 of the electronic document 600, which eliminates the coding. The system further comprises means for allowing the client computer 700 to accept or delete the coding, and a browser 300 connected to the buffer 200, wherein the browser 300 is configured for presenting to the client computer 700 a description of the coding. The description may be shown as overlay text and graphics over the original document 600, or in a separate region of the window or a separate window that may also include controls, such as buttons, dials, slide bars or checkboxes, to block or approve the identified hidden commands in the electronic document 600.

The document analysis and alteration may be performed in the user interface browser 300, in the client computer 700, on a server 350 which is used by the client computer 700, which may be embodied as a proxy server, or a server which hosts and serves the document 600, or a safety web service operated by another computer or server 351 independent of the original document server 350 and the client computer 700. In one embodiment, the document analysis and alteration is performed on the client computer 700 by computer-implemented software 250 that is buffered between the browser 300 and the network 800, or between the browser 300 and client firewire software 255. While some level of protection may be provided by the browser 300 under some configurations and under certain settings, the protection level provided by one embodiment of the invention may be performed before the document 600 reaches the browser 300 (by the buffer 200) and without any hidden code which when executed would alter security or privacy settings of the browser 300.

Figure 3A:
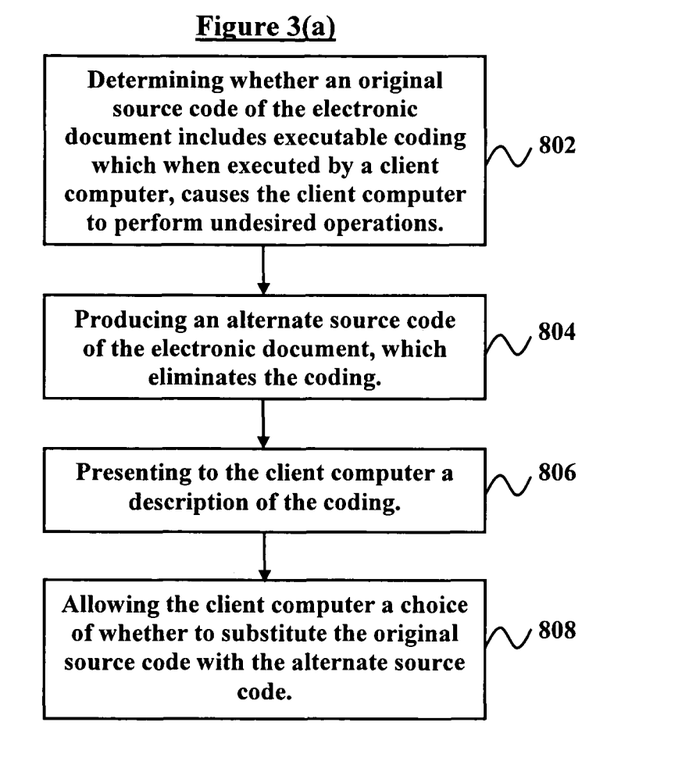

As illustrated in the flow diagram of FIG. 3(a), the invention provides a method of buffering an electronic document 600 received from a sender, such as a host computer 500, wherein the method comprises first, determining (802) whether an original source code 100 of the electronic document 600 includes executable coding which when executed by a client computer 700, causes the client computer 700 to perform undesired operations, and producing (804) an alternate source code 400 of the electronic document 600, which eliminates the coding, wherein the undesired operations are characterized as undesirable based on predetermined settings established by the client computer 700. The electronic document 600 comprises any of a web page, electronic mail message, an electronic mail attachment, a note in a hypertext format, a text document, a text file, and an application-specific electronic document. Additionally, each of the original source code 100 and the alternate source code 400 comprises a hypertext transfer protocol (HTTP) source code.

The step of determining (802) comprises establishing a set of rules and patterns for detection and inspection of different types of operations, system calls, registry alterations, and browser settings alterations on the client computer 700, wherein the rules and patterns are learned from a set of samples using machine learning techniques comprising classifier training. Additionally, the step of determining (802) comprises gathering information and user decisions about controlled links in the electronic document, or a history of previous access to the electronic document or to a substantially similar document; and using the information to adjust the set of rules. Moreover, the step of producing (804) is performed on any of the client computer 700, a server 350 storing the electronic document 600, a proxy server 351 attached to the client computer 700, and an intermediary computer 352 (shown in FIG. 2) operable for providing a security service to buffer the electronic document 200. Also, the alternate source code 400 disables linked items in the electronic document 600 and controls access to linked items in the electronic document 600.

Furthermore, the sender comprises any of a host computer 500, a server 350, and a program storage device (not shown), such as a compact disc (CD). The method further comprises presenting (806) to the client computer 700 a description of the coding, wherein the description comprises an explanation of an effect to the client computer 700 of accepting the coding by the client computer 700, and allowing (808) the client computer 700 a choice of whether to substitute the original source code 100 with the alternate source code 400, wherein the description comprises an identification of hidden commands and hidden links in the original source code 100, wherein the description comprises a determination of a validity of information included in the coding, and wherein the description comprises instructions relating to scripts, code, dynamic HTML or self-modifying code, or plug-ins that run when the client computer retrieves the electronic document. The instructions further relate to scripts associated with or activated by clickable elements such as form buttons, figures and embedded links, hidden requests to change security-related settings or privacy-related settings or any other settings of the browser 300, the client computer 700, the operating system 205 or any of the applications installed thereon, or to install/remove applications.

Figure 3B:
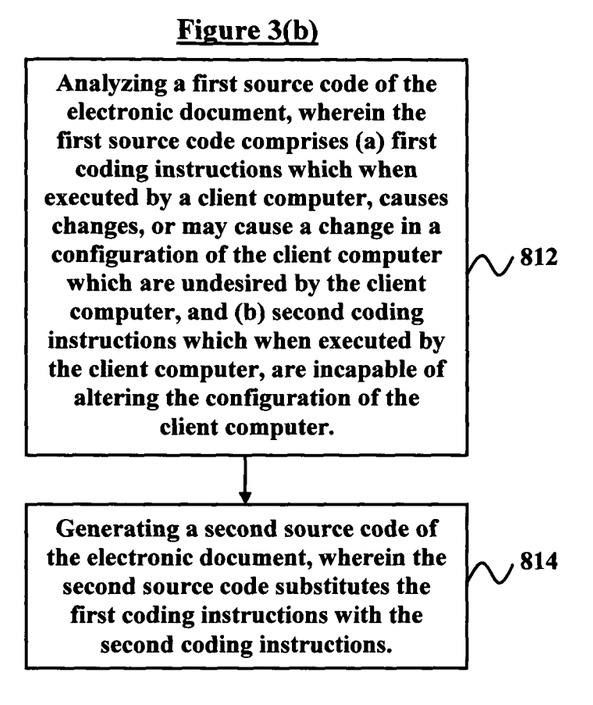

In other words, as shown in the flow diagram of FIG. 3(b), the invention provides a method of filtering an electronic document 600 received from a sender, such as a host computer 500, wherein the method comprises analyzing (812) a first source code 100 of the electronic document 600, wherein the first source code 100 comprises (a) first coding instructions which when executed by a client computer 700, causes changes, or may cause a change in a configuration of the client computer 700 which are undesired by the client computer 700, and (b) second coding instructions which when executed by the client computer 700, are incapable of altering the configuration of the client computer 700; and generating (814) a second source code 400 of the electronic document 600, wherein the second source code 400 substitutes the first coding instructions with the second coding instructions.

The invention produces a new "safe" HTML file/document 400, which is processed by the browser 300 in a different window from the potentially viewed web page. The new file 400 has all of the elements of the original HTML file 100 subject to the following differences. The first difference involves the substitution of "on mouse over" actions. Here, according to the invention, any "on mouse over" area is neutralized and, in its place, a message is displayed for the user explaining the effect of said mouse over area. For example, suppose the following fragment is found in the original HTML source: <a href=" " onmouseover='alert("Ha Ha")'>Place your mouse here</a>. A conventional browser displays, in this case, the text "Place your mouse here". When the mouse is placed over the text "Place your mouse here", a pop-up window displays "Ha Ha". As such, the client's computer 700 is unwelcomingly activated. An example of a situation in which a client's computer 700 is undesirably altered involves changing the client's computer's internet browser settings, and for this example, Microsoft's Internet Explorer is considered. If the following fragment is found in the original HTML source: <a HREF onmouseover="this.style.behavior='url (#default#homepage)'; this.setHomePage('http://www.an.unwanted. homepage.com');">Place your mouse here</a>. A conventional browser displays the text "Place your mouse here". However, placing the mouse on this text activates executable code that changes the default home page of Internet Explorer to "http://www.an.unwanted. homepage.com". As such, the browser may or may not open a box for the user to verify the operation. Additionally, the unwanted operations may occur not through the internet browser itself, but also in an e-mail viewer, whereby the modifiable executable code, such as any Visual Basic Script (VBS), is embedded in a document and is invoked when the document is retrieved/viewed from an e-mail.

According to one embodiment, the invention overcomes this by automatically substituting the HTML source 100 with: <a href=" ">Don't place your mouse here <B>(Warning: This is an onmouseover area. The following was extracted: onmouseover='alert("Ha Ha")')</B></a>. This tells the user that by placing the mouse over that text, the function alert would run.

The next difference between the alternate source code 400 and the original source code 100 involves displaying actual link information, wherein in most cases, when the mouse is placed over a clickable item, the browser displays at the bottom of the page the URL associated with the clickable item. However, some authors of web pages eliminate or alter this information and can actually disguise the true URL information. As such, the invention identifies the hidden URL information, finds that this hidden URL information is different from the "on mouse over" displayed content, eliminates this link and prompts for the decisive information and possible acts by displaying the hidden URL information to the user.

Another difference between the alternate source code 400 and the original source code 100 involves detection of misleading links in the electronic document 600. For example, when a URL is inserted in a text document, it is often made as an active link to the actual website. For example, in <a href="http://www.paypal.com/">http://www.paypal.com</a>, the browser 300 displays only this: http://www.paypal.com/. However, one could show the same URL in the text and make it an active link to a different website. For example: <a href="http://www.differentsite.com/faked_paypal_login.html" http://www.paypal.com/</a>.

Here, the browser 300 displays the same http://www.paypal.com/, but a click on the link takes the user to the different site/page. As such, a user can be tempted to click on the link without being aware of the scheme. However, the invention's automatic filtering buffer 200 detects the misleading website by comparing the actual link URL http://www.differentsite.com/faked_paypal_login.html in the example above with the visible anchor text http://www.paypal.com.

Another difference between the alternate source code 400 and the original source code 100 involves the deactivation of scripts that run automatically on some events. For example, some web pages have built-in scripts that run automatically when the web page is first loaded or on exit from a page. In e-mail, such features are much less expected and thus, there presence should be revealed to the user. According to the invention, the warning/modification of the web page may depend on user-specific rules that would determine when to allow such features to be activated and when to warn the user before doing so. Warnings can be made in the browser 300 of the client computer 700 by an alert (pop-up window), by changing the appearance of a region (e.g., change its color), and could be supported by an audible alert (beep, or speech synthesis). However, if the automatic code does not contain any code that might alter the configuration of the client computer 700, the code may be left intact in the altered version of the document, as it would constitute a "safe" feature as previously described.

Click prevention is another difference between the alternate source code 400 and the original source code 100. According to the invention, instead of disabling all clickable items, the safe HTML file 400 can disable links selectively or substitute "regular clicks" by "controlled clicks"; e.g., ones which require also holding down the 'Ctrl' key. Additionally, the safe HTML code 400 is temporarily stored, cached, held in memory, or is delivered directly to the client browser 300. This greatly depends on where the actual document analysis and alteration takes place; i.e., on the client computer 700, in the browser 300 (e.g., by the browser itself, or by a safety plug-in), on the client computer 700 by another application such as a web intermediary or proxy (not shown), on a web proxy to which the client computer browser 300 points to (not shown), or on the server 350 which hosts the document 600. In each of these cases the altered document 400 may be kept or cached or stored differently, such that if a user revisits a particular website, the system caches the information regarding the previously visited websites. If cached, the system may further save the altered document 400 with the altered cached version which includes any decisions made by the user, such as allowing some scripts to run and some buttons to work. That is, the return (by the user) to the same document also maintains the state of decisions made by the user in previous visits with regard to the alterations and alerts. Thus, the invention is adapted to save time by first checking whether the current HTML source code is the same as the previously analyzed one (HTML source code 400), and if so the system displays the safe HTML source code 400.

Analysis of a 600 document and alteration of the document 600 may be based on a set of predetermined rules, such as the rules described above. The analysis and alteration may also be based on a translation mechanism, automatically acquired from a set of examples and their alterations. Furthermore, the rules may be adapted to the user behavior over time. For example, if a user enables links and scripts on pages containing news information from a newspaper web site but disables all the advertisement links that link to other web sites than the newspaper itself, including hidden links and automatic pop-up windows, the system may adopt a rule over time and allow those internal links and scripts while keep filtering and altering and controlling the advertisements.

Figure 4:
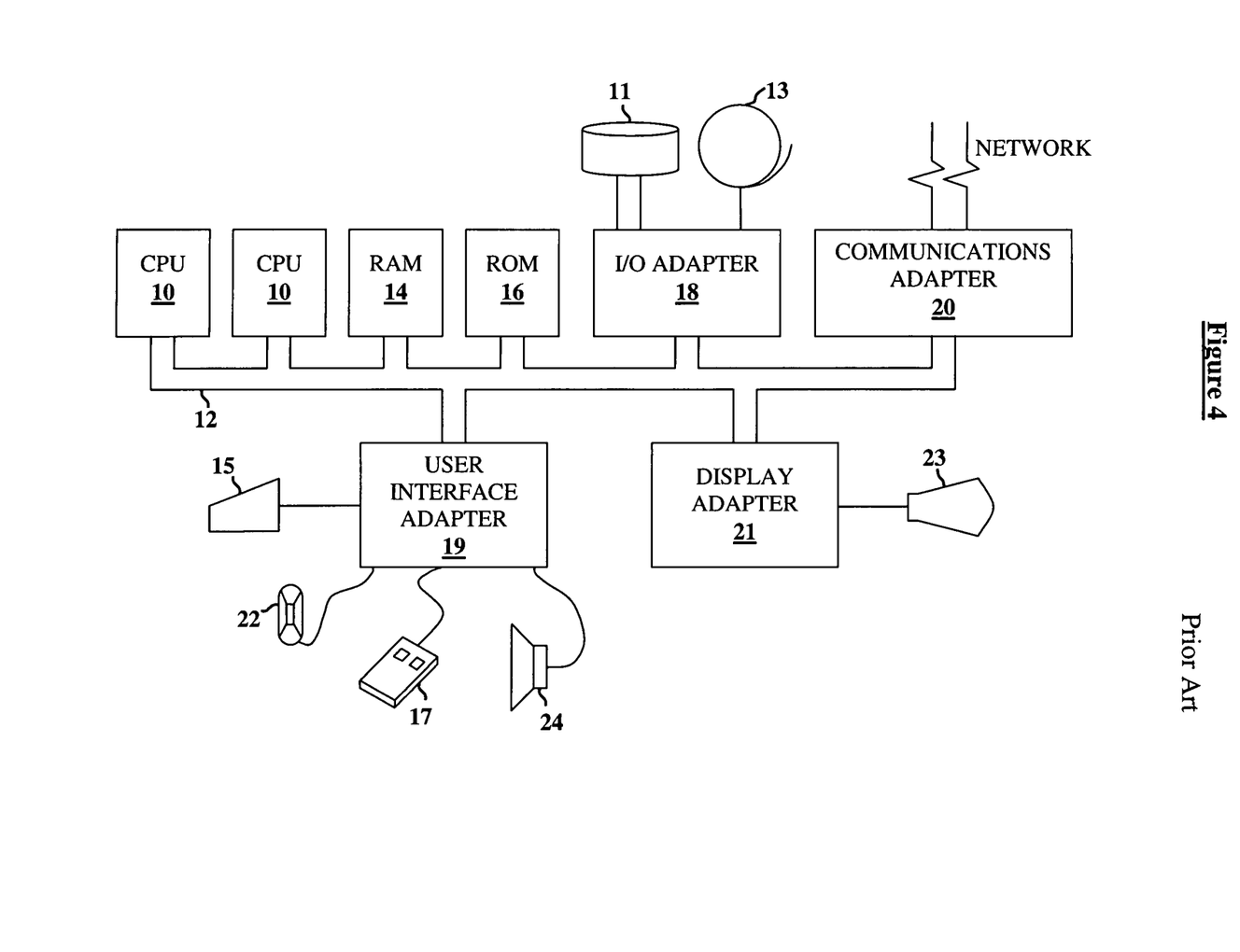
FIG. 4 is a computer system diagram illustrating an embodiment of the invention.

A representative hardware environment for practicing the present invention is depicted in FIG. 4, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

Generally, the invention provides a method and system of buffering an electronic document 600 received from a server, such as a host computer 500, wherein the system comprises means for analyzing a first source code 100 of the electronic document 600, wherein the first source code 100 comprises first coding instructions which when executed by a client computer 700, causes changes in a configuration of the client computer 700 which are undesired by the client computer 700, and second coding instructions which when executed by the client computer 700, are incapable of altering the configuration of the client computer 700; and means for generating a second source code 400 of the electronic document 600, wherein the second source code 400 substitutes the first coding instructions with the second coding instructions.

The invention is advantageous in improving the safety of viewing web pages and using web-based applications. Any entity, and in particular an e-commerce entity, which relies on these activities would benefit from the invention in the sense that customers would be more inclined to use the applications presented on a web site if they feel safe when visiting the web site and downloading files. Other advantages provided by the invention included increased protection of a client computer, software, and settings, as well as privacy against invasion by a third party. Furthermore, the invention allows for better user experience in the navigation of web pages by eliminating otherwise unpredictable behaviors caused by hidden codes and scripts. Additionally, the invention achieves better control over content that arrives at the client computer in the form of documents and files.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A computer-implemented method of buffering an electronic document containing a plurality of unsafe features received from a sender, said method comprising:

establishing, by a client computer, a set of rules and patterns to detect said plurality of unsafe features in source codes;

receiving, by said client computer, an original source code of said electronic document containing said plurality of unsafe features, said plurality of unsafe features including undesired executable coding including hidden commands which, when executed, causes said client computer to perform undesired operations;

caching, by said client computer, said electronic document in a buffer of said client computer;

determining, by said client computer, said electronic document contains said plurality of unsafe features by applying said set of rules and patterns to said electronic document to identify said undesired executable coding;

producing, by said client computer, an alternate source code of said electronic document, which eliminates said undesired executable coding of said plurality of unsafe features from said original source code by replacing said undesired executable coding with said alternate source code which does not cause said client computer to perform said undesired operations and displays a message indicating said plurality of unsafe features have been removed;

presenting, by said client computer, a description of said undesired executable coding of said plurality of unsafe features from said original source code, said description identifying said hidden commands and explaining an effect of said undesired executable coding in a window display on said client computer;

presenting, to a user of said client computer, a choice of whether to replace said undesired executable coding from said original source code with said alternate source code to produce a safe electronic document, and caching said safe electronic document in said buffer;

gathering, by said client computer, information about said choice of said user, and using said information to adjust said set of rules and patterns; and executing, by said client computer, said safe electronic document that is cached so as to display said safe electronic document corresponding to said electronic document and said message indicating said plurality of unsafe features contained in said electronic document have been removed, said safe electronic document avoiding performance, by said client computer, of said undesired operations.

2. The method of claim 1, said electronic document comprising any of a web page, electronic mail message, an electronic mail attachment, a note in a hypertext format, a text document, a text file, and an application-specific electronic document.

3. The method of claim 1, said original source code and said alternate source code comprising a hypertext markup language (HTML) source code.

4. The method of claim 1, said undesired operations comprising any of altering a configuration of said client computer, installing a code in said client computer, installing a plug-in command in said client computer, installing a program in said client computer, installing an application in said client computer, installing executable scripts in said client computer, saving a file in said client computer, reading a file in said client computer, transmitting from said client computer, a file, security-related information, and personal settings from said client computer.

5. The method of claim 1, said set of rules and patterns detecting and inspecting different types of operations, system calls, registry alterations, and browser settings alterations on said client computer.

6. The method of claim 5, said set of rules and patterns being learned from a set of samples using machine learning techniques comprising classifier training.

7. The method of claim 5, said information comprising any of: decisions of said user about controlled links in said electronic document, and a history of previous access to said electronic document and to a similar document.

8. The method of claim 1, said producing being performed on any of said client computer, a server storing said electronic document, a proxy server attached to said client computer, and an intermediary computer operable for providing a security service to buffer said electronic document.

9. The method of claim 1, said original source code and said alternate source code disabling linked items in said electronic document.

10. The method of claim 1, said original source code and said alternate source code controlling access to linked items in said electronic document.

11. The method of claim 1, said sender comprising any of a host computer, a server, and a program storage device.

12. The method of claim 1, said description comprising an identification of hidden, non-displayed commands and hidden, non-displayed links in said original source code.

13. The method of claim 1, said description comprising instructions relating to scripts that run when said electronic document is retrieved by said client computer.

14. The method of claim 1, said producing of said alternate source code of said electronic document, further comprising:
neutralizing an "on mouse over" area of said electronic document in said original source code;
displaying a message on said client computer that explains an effect of said "on mouse over" area; and
adding code to said alternate source code to display, "Don't place your mouse here", on text of said safe electronic document that is proximate to said "on mouse over" area of said safe electronic document.

15. The method of claim 1, said producing of said alternate source code of said electronic document, further comprising:
comparing said originals source code for a URL displayed by said electronic document to an actual URL link in said original source code.

16. A computer-implemented method of filtering an electronic document containing a plurality of unsafe features received from a sender, said method comprising:
establishing, by a client computer, a set of rules and patterns to detect said plurality of unsafe features in coding instructions;
receiving, by a client computer, first coding instructions of said electronic document including said plurality of unsafe features including undesired executable coding and hidden commands that cause changes in a configuration of said client computer which are undesired by said client computer;
caching, by said client computer, said electronic document in a buffer of said client computer;
determining, by said client computer, said electronic document contains said plurality of unsafe features by applying said set of rules and patterns to said electronic document to identify said undesired executable coding;
producing, by said client computer, second coding instructions for said electronic document, which eliminates said undesired executable coding of said plurality of unsafe features from said first coding instructions by replacing said undesired executable coding with said second coding instructions which do not cause said client computer to change said configuration and display a message indicating said plurality of unsafe features have been removed;
presenting, by said computer, a description of said undesired executable coding of said plurality of unsafe features from said first coding instructions, said description identifying said hidden commands and explaining an effect on said unsafe features in a window display on said client computer;
presenting, to a user of said client computer, a choice of whether to replace said undesired executable coding from said first coding instructions with said second coding instructions to produce a safe electronic document, and caching said safe electronic document in said buffer; and executing, by said client computer, said safe electronic document that is cached, so as to display said safe electronic document corresponding to said electronic document and said message indicating said plurality of unsafe features contained in said electronic document have been removed, said safe electronic document avoiding said changes of said configuration of said client computer which are undesired.

17. A computer system comprising a non-transitory program storage device for storing instructions executable by a client computer to perform a method for filtering an electronic document containing a plurality of unsafe features received from a sender, said system comprising:

a memory that caches source codes; and
a processor processing operations of:
establishing a set of rules and patterns to detect said plurality of unsafe features in said source codes;
receiving an original source code of said electronic document containing said plurality of unsafe features, said plurality of unsafe features including undesired executable coding including hidden commands which, when executed, perform undesired operations;
caching said electronic document in a buffer of said client computer;
determining said electronic document contains said plurality of unsafe features by applying said set of rules and patterns to said electronic document to identify said undesired executable coding;
producing an alternate source code of said electronic document, which eliminates said undesired executable coding of said plurality of unsafe features from said original source code by replacing said undesired executable coding with said alternate source code which does not perform said undesired operations and displays a message indicating said plurality of unsafe features have been removed;
presenting a description of said undesired executable coding of said plurality of unsafe features from said original source code, said description identifying said hidden commands and explaining an effect of said undesired executable coding in a window display;
presenting to a user, a choice of whether to replace said undesired executable coding from said original source code with said alternate source code to produce a safe electronic document, and caching said safe electronic document in said buffer;
gathering information about said choice of said user, and using said information to adjust said set of rules and patterns; and
executing said safe electronic document that is cached so as to display said safe electronic document corresponding to said electronic document and said message indicating said plurality of unsafe features contained in said electronic document have been removed, said safe electronic document avoiding performance of said undesired operations.

18. The system of claim 17, said electronic document comprising any of a web page, electronic mail, an electronic mail attachment, a note in a hypertext format, a text document, a text file, and an application-specific electronic document.

19. The system of claim 17, said original source code and said alternate source code comprising a hypertext markup language (HTML) source code.

20. The system of claim 17, said original source code and said alternate source code disabling linked items in said electronic document.

21. The system of claim 17, said original source code and said alternate source code controlling access to linked items in said electronic document.

22. The system of claim 17, said original source code and said alternate source code disabling clickable items in said electronic document.

23. The system of claim 17, further comprising a user interface connected to said buffer, wherein said user interface presents said description of said undesired executable coding.

24. The system of claim 23, said description comprising an identification of hidden, non-displayed commands and hidden, non-displayed links in said original source code.

25. The system of claim 23, said description comprising instructions relating to scripts that run when said electronic document is retrieved.

26. The system of claim 23, said user interface being embedded into said original source code and said alternate source code by adding a hypertext markup language (HTML) code and scripts to produce new mouse over information and controlled clickable items.

27. A tangible program storage device readable by computer, tangibly embodying a program of instructions executable by said computer to perform a computer-implemented method of buffering an electronic document containing a plurality of unsafe features received from a sender, said method comprising:

establishing a set of rules and patterns to detect said plurality of unsafe features in said source codes;
receiving an original source code of said electronic document containing said plurality of unsafe features, said plurality of unsafe features including undesired executable coding including hidden commands which, when executed, perform undesired operations;
caching said electronic document in a buffer of said client computer;
determining said electronic document contains said plurality of unsafe features by applying said set of rules and patterns to said electronic document to identify said undesired executable coding;
producing an alternate source code of said electronic document, which eliminates said undesired executable coding of said plurality of unsafe features from said original source code by replacing said undesired executable coding with said alternate source code which does not perform said undesired operations and displays a message indicating said plurality of unsafe features have been removed;
presenting a description of said undesired executable coding of said plurality of unsafe features from said original source code, said description identifying said hidden commands and explaining an effect of said undesired executable coding in a window display;
presenting to a user, a choice of whether to replace said undesired executable coding from said original source code with said alternate source code to produce a safe electronic document in said buffer;
gathering information about said choice of said user, and using said information to adjust said set of rules and patterns; and
executing said safe electronic document that is cached so as to display said safe electronic document corresponding to said electronic document and said message indicating said plurality of unsafe features contained in said electronic document have been removed, said safe electronic document avoiding performance of said undesired operations.

28. The tangible program storage device of claim 27, said electronic document comprising any of a web page, electronic mail message, an electronic mail attachment, a note in a hypertext format, a text document, a text file, and an application-specific electronic document.

29. The tangible program storage device of claim 27, said original source code and said alternate source code comprising a hypertext markup language (HTML) source code.

30. The tangible program storage device of claim 27, said undesired operations comprising any of altering a configuration of said client computer, installing a code in said client computer, installing a plug-in command in said client computer, installing a program in said client computer, installing an application in said client computer, installing executable scripts in said client computer, saving a file in said client computer, reading a file in said client computer, transmitting from said client computer, a file, security-related information, and personal settings from said client computer.

31. The tangible program storage device of claim 27, said set of rules and patterns detecting and inspecting different types of operations, system calls, registry alterations, and browser settings alterations on said client computer.

32. The tangible program storage device of claim 31, said rules and patterns being learned from a set of samples using machine learning techniques comprising classifier training.

33. The tangible program storage device of claim 31, said gathering information including user decisions about controlled links in said electronic document, and a history of previous access to said electronic document and to a similar document.

34. The tangible program storage device of claim 27, said producing being performed on any of said client computer, a server storing said electronic document, a proxy server attached to said client computer, and an intermediary computer operable for providing a security service to buffer said electronic document.

35. The tangible program storage device of claim 27, said original source code and said alternate source code disabling linked items in said electronic document.

36. The tangible program storage device of claim 27, said original source code and said alternate source code controlling access to linked items in said electronic document.

37. The tangible program storage device of claim 27, said original source code and said alternate source code disabling clickable items in said electronic document.

38. The tangible program storage device of claim 27, said description comprising an identification of hidden, non-displayed commands and hidden, non-displayed links in said original source code.

39. The tangible program storage device of claim 27, said description comprising instructions relating to scripts that run when said electronic document is retrieved by said client computer.

40. The tangible program storage device of claim 27, said producing of said alternate source code of said electronic document, further comprising:
neutralizing an "on mouse over" area of said electronic document in said original source code;
displaying a message on said client computer that explains an effect of said "on mouse over" area; and
adding code to said alternate source code to display, "Don't place your mouse here", on text of said safe electronic that is proximate to said "on mouse over" area of said safe electronic document.

41. The tangible program storage device of claim 27, said producing of said alternate source code of said electronic document, further comprising:
comparing said originals source code for a URL displayed by said electronic document to an actual URL link in said original source code.

\* \* \* \* \*